Aug. 17, 1926.
P. GAMBAROTTA
SPEED INDICATING APPARATUS
Filed Oct. 26, 1922   2 Sheets-Sheet 1
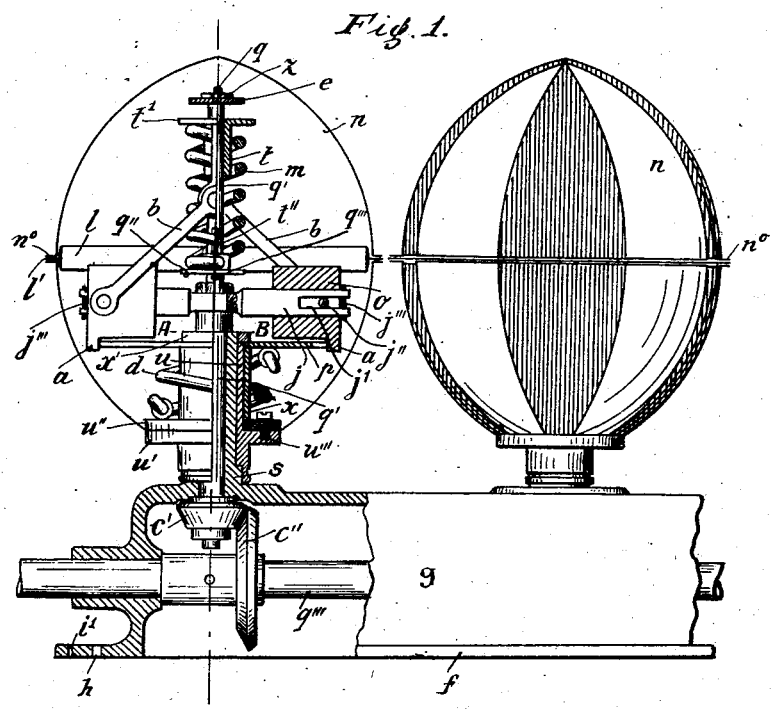
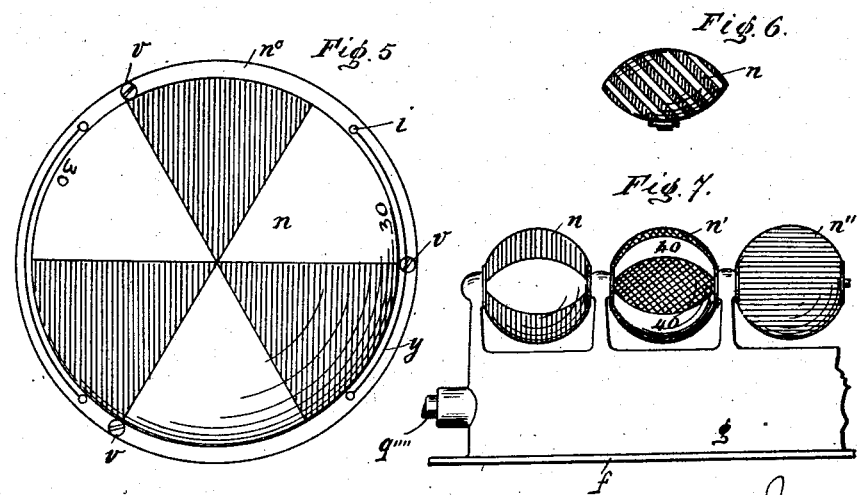

Aug. 17, 1926.  1,596,345
P. GAMBAROTTA
SPEED INDICATING APPARATUS
Filed Oct. 26, 1922   2 Sheets-Sheet 2
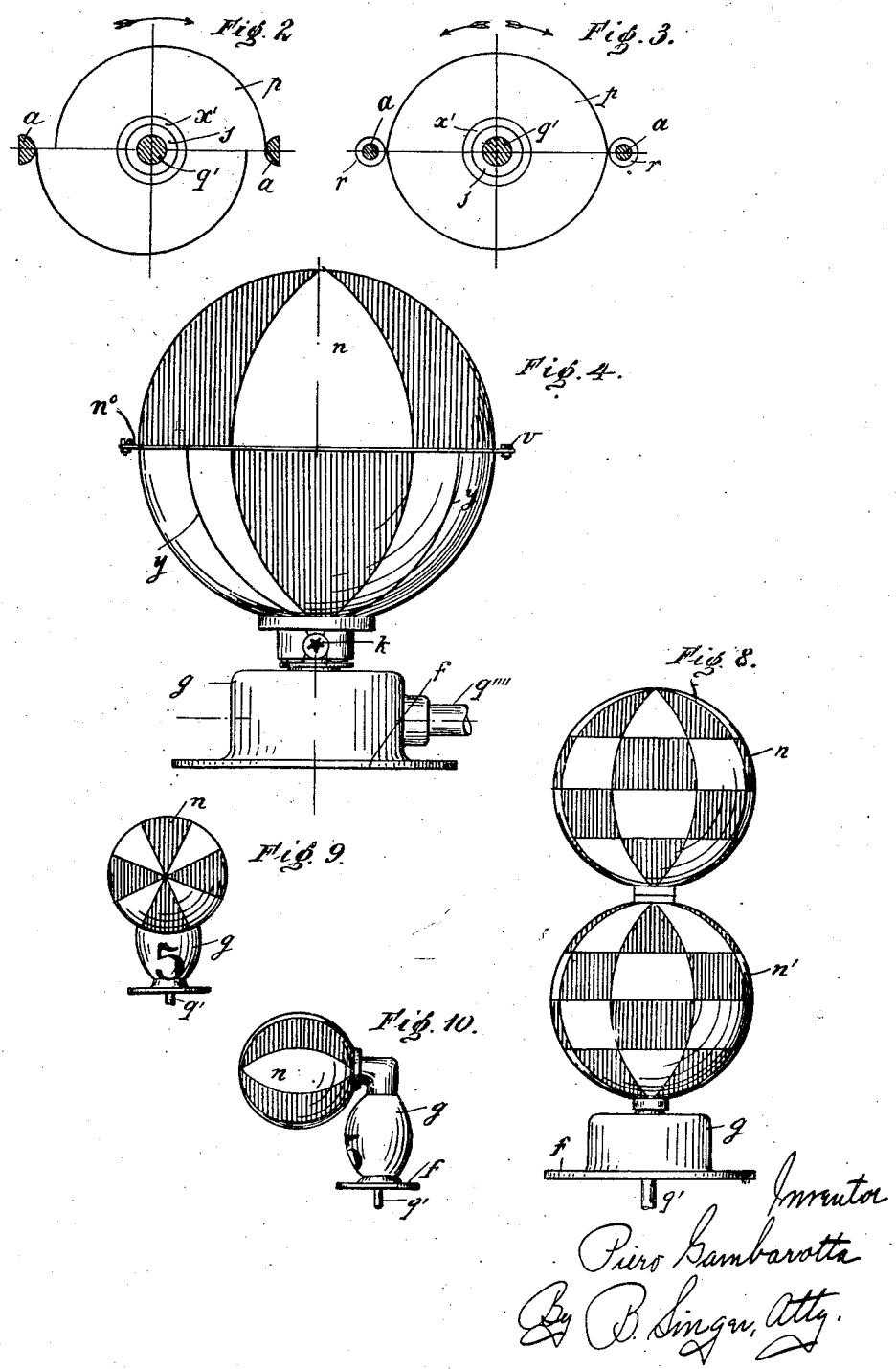

Patented Aug. 17, 1926.

1,596,345

UNITED STATES PATENT OFFICE.

PIERO GAMBAROTTA, OF QUINTO AL MARE, ITALY.

SPEED-INDICATING APPARATUS.

Application filed October 26, 1922, Serial No. 597,209, and in Italy November 24, 1921.

The present invention has for its object an apparatus to be mounted especially upon vehicles in a position in which it is perfectly visible not only to the driver but also to passers-by (as, for instance, upon a front mudguard), with a view to indicating or signalling, at any instant, even to persons at a certain distance in front, at the sides or at the rear of the vehicle in motion, the rate of speed at which it is travelling.

The speed indicating apparatus according to the invention primarily consists in balls, so painted that they give sensibly different appearance when stationary and when rotating, said balls being maintained in rotation until a speed specially predetermined for it has been attained and are then brought to a standstill, and being again caused to rotate when the speed decreases to a lower rate than said predetermined speed.

Referring to the accompanying drawings:—

Figure 1 is an elevation of an apparatus with two or more egg-shaped balls adapted to turn about their greater diametres for giving signals or indications relative to two or more speeds.

Figures 2 and 3 show alternative details of the means for rotating the balls.

Figure 4 is an elevation and Figure 5 is a plan of an apparatus with a spherical ball painted in white and red sections and so adjusted as to stop when the speed of the vehicle attains 30 kilometres per hour.

Figure 6 shows one of the other numerous forms and aspects which may be given to the balls.

Figure 7 represents an apparatus with three or more spherical balls placed side by side, these balls being differently colored or painted and adapted to revolve about their horizontal diameters.

Figure 8 shows an apparatus with two superimposed balls for indicating or signalling two different speeds (100 and 200 kilometres per hour).

Figures 9 and 10 show in front and side elevation respectively an apparatus with a spherical ball revolving about its horizontal axis and supported at one end thereof.

As will be seen from the drawings the apparatus is composed substantially of balls —$n$— to each of which there corresponds a definite speed in kilometres per hour, this speed being shown upon the balls and upon the support of the apparatus (for instance kilometres per hour 5, 20, 30, 40, 60, 100, 200, etc.).

The main shaft of the apparatus must be driven with a speed proportionate to that of the vehicle, or of that of the engine mounted therein.

Each ball is colored in contrasting tints (for instance in red and white, or black and white) and is driven in such a manner that if the speed of the vehicle in motion is lower than the limit for which the driving mechanism of the ball has been adjusted, the ball turns and consequently does not allow its coloring to be seen distinctly, whereas, if the vehicle exceeds such limit, the ball stops and allows its coloring to be seen distinctly even at a distance, the ball again beginning to turn directly the vehicle slows down to a speed below that for which the limit is fixed.

It is, therefore, clear that if we assume, for example, an apparatus with ten balls so adjusted as to stop respectively at 10, 20, 30, . . . kilometres per hour, when the first five balls are seen to be motionless it will be understood that the vehicle is running at a speed between 50 and 60 kilometres per hour; when the first three balls are seen to be motionless it will be understood that the vehicle is travelling at a speed between 30 and 40 kilometres per hour, and so on.

As shown in Figures 1, 4 and 5, each ball —$n$— is formed in two hollow parts having flanges —$n°$— provided with holes for screws or bolts —$v$— which, in conjunction with a ring —$l$— provided with a flange —$l'$— lying between the flanges —$n°$—, serve to assemble the parts together. Holes —$i$— are also provided for the lead-sealing wire —$y$— the ends of which are enclosed and sealed in the leadseal —$k$— (Fig. 4) for the purpose of preventing unauthorised handling of the adjustment of the device.

Each ball is rotated by means of a centrifugal governor mechanism comprising two or more bodies —$o$— which are connected, by means of pivoted connecting links —$b$—, which a sleeve —$t$— mounted on the shaft —$q'$—. This sleeve is mounted on said shaft so as to slide but not to turn about it, and a convenient stop limits its upwards movement.

Each body —$o$— is provided with an horizontal hole into which an end of a shaft —$j$— crossing the shaft —$q'$— can pass so as to allow to the body of sliding along the shaft —j—.

Each end of the shaft —j— has a slot —j'— in which a pin —j"— solid with the body —o— is located. A pin —j'''— mounted at each end of the shaft —j— limits the displacement of the bodies —o—. These bodies are each provided with an appendix —a— (Figures 1, 2 and 3) which may be arranged with rollers —r— as shown in Fig. 3. When the speed of the vehicle or machine is less than a given value, said appendices —a— will carry along with them a fashioned or profiled plate —p— yieldably mounted between a sleeve —x— surrounding the hub —u— of the ball and a nut —x'— threaded on the free end of the tubular projection —s— of the support —g—. Upon the said speed being increased above the said given value, the bodies —o— will move radially outwards, against the action of the counteracting spring —m— of the governor arranged between the flange —t'— of the sleeve —t— and a ring-plate —q"—, and disengage the plate —p— so that the ball no longer revolves. The plate —p— may be fashioned or profiled in the form of two semi-eccentrics connected along one diametre (Fig. 2) or else they may have an oval form (Fig. 3). Each plate —p— is suitably connected to the respective ball, by means of a resilient member, for instance by means of a spiral spring —d— (Fig. 1) one end of it is connected to the plate while the other is connected to a ring —u"— secured, by means of screws —u'''— to the flange —u'— of the hub —u— of the ball.

In Figures 2 and 3 the appendices —a— of the bodies —o— are shown at the moment where they are about to disengage the plates —p—.

The adjustment of the ball driving mechanism in order that the balls may stop at the desired speed is effected by varying the distance between the flange —t'— of the sleeve —t— and a ring-plate —q"—: thereby the compression of the counteracting spring —m— of the governor is adjusted.

To this purpose the main shaft —q'— is made hollow, and is provided with diametrally opposed longitudinal apertures —t"—. In the hollow of the shaft —q'— can slide a stem —q— whose inner end carries pins —q'''— projecting from said apertures —t"— of the shaft —q'— and supporting said ring-plate —q"—. On the other threaded end of the stem —q— a nut —z— is mounted, which rests on the free end of the shaft —q'—. By convenient action exerted on said nut the ringplate —q"— can be displaced, thus compressing more or less the counteracting spring —m—.

The support —g— of the apparatus has flanges —f— provided with holes —h— for attachment to the mudguard or elsewhere, and also with holes —i'— for the passage of another lead-sealing wire therethrough. Said support —g— carries the transmission shaft —q''''— which is driven, either directly or through the medium of suitable transmission members, by the motor shaft of the vehicle or by suitable member of the vehicle or machine. Fixed on said shaft —q''''— are gears —c"— which mesh with other gears —c'— each of which is fastened to one of the shafts —q'—. These latter shafts are carried in hubs —s— projecting from the support —g—. The edge of the lower hole of each ball —n— rests on a flange —u'— of the corresponding hub —u—. A ring —u"— and screws —u'''— serves to secure the ball —n— to the flange —u'— of the hub —u—.

If desired the balls may be arranged to revolve on inclined, or horizontal (Figures 7, 9 and 10) or vertical (Figure 8) axes.

Having now particularly described and ascertained the nature of my said invention and in what manner the same is to be performed, I declare that what I claim is:—

1. A speed indicating device comprising a ball having sections colored or painted in different colors; means to rotate said ball until a predetermined rate of speed has been attained and means, effective at said predetermined rate of speed, to release the ball and permit of same coming to a standstill and to cause said ball to again rotate when the speed again decreases below said predetermined rate of speed.

2. A speed indicating device comprising a main shaft which can be driven about its axis through transmission members from the motor shaft, a ball axially and freely mounted on said main shaft, a substantially elliptic plate yieldingly connected to the hub of said ball; a centrifugal governor whose links are mounted on, and arranged for turning together with, said main shaft; another shaft fixed to, and crossing normally, the said main shaft on which the bodies of centrifugal governor can slide a compression spring counteracting the displacement of the bodies of the centrifugal governor, and projections from external ends of lower face of said bodies bearing on the outline of said elliptic plate to rotate the ball until a predetermined rate of speed is attained and to thereafter release it to permit it to become stationary.

In testimony whereof I affix my signature.

PIERO GAMBAROTTA.